United States Patent
Chen et al.

(10) Patent No.: US 11,239,971 B2
(45) Date of Patent: Feb. 1, 2022

(54) METHOD AND APPARATUS WITH ENHANCED CONTROL MESSAGES AND SEARCH SPACE

(71) Applicant: TEXAS INSTRUMENTS INCORPORATED, Dallas, TX (US)

(72) Inventors: Runhua Chen, Plano, TX (US); Anthony Edet Ekpenyong, Allen, TX (US); Vikram Chandrasekhar, Mountain View, CA (US); Ralf Matthias Bendlin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/666,429

(22) Filed: Nov. 1, 2012

(65) Prior Publication Data
US 2013/0114528 A1 May 9, 2013

Related U.S. Application Data (60) Provisional application No. 61/589,935, filed on Jan. 24, 2012, provisional application No. 61/557,550, filed on Nov. 9, 2011, provisional application No. 61/555,008, filed on Nov. 3, 2011.

(51) Int. Cl.
*H04L 5/00* (2006.01)
*H04B 7/26* (2006.01)

(52) U.S. Cl.
CPC ......... *H04L 5/0053* (2013.01); *H04B 7/2656* (2013.01)

(58) Field of Classification Search
None
See application file for complete search history.

(56) References Cited

U.S. PATENT DOCUMENTS

| | | |
|---|---|---|
| 2008/0298224 A1 | 12/2008 | Pi et al. |
| 2009/0061916 A1 | 3/2009 | Kim et al. |
| 2009/0175372 A1 | 7/2009 | Moon et al. |
| 2011/0090860 A1 | 4/2011 | Ihm et al. |
| 2011/0249633 A1* | 10/2011 | Hong et al. .................. 370/329 |
| 2011/0310829 A1* | 12/2011 | Ji .......................... H04L 5/0037 370/329 |

(Continued)

FOREIGN PATENT DOCUMENTS

CN      102076098 A    5/2011

OTHER PUBLICATIONS

First Office Action dated Jun. 3, 2020, Chinese Application No. 201810149337.7, 12 pages.

(Continued)

*Primary Examiner* — Adnan Baig
(74) *Attorney, Agent, or Firm* — Gregory J. Albin; Charles A. Brill; Frank D. Cimino (57) ABSTRACT

A method of mapping control information in a wireless communication system is disclosed (FIG. 5). The method includes forming a subframe (FIG. 3) having a bandwidth and having plural regions (302-306). A base station (eNB) determines a communication mode with a remote user equipment. The base station maps control information specific to the user equipment into a first region of the subframe (508). The base station also maps control information common to plural user equipments into a second region of the subframe (512). The subframe is transmitted to the plural user equipments (412, FIG. 4).

30 Claims, 9 Drawing Sheets

(56) References Cited

U.S. PATENT DOCUMENTS

| | | | |
|---|---|---|---|
| 2012/0113831 A1* | 5/2012 | Pelletier et al. | 370/252 |
| 2012/0188974 A1* | 7/2012 | Qiang | H04W 52/146 |
| | | | 370/329 |
| 2013/0003604 A1* | 1/2013 | Blankenship | H04L 5/0023 |
| | | | 370/255 |
| 2013/0039284 A1* | 2/2013 | Marinier et al. | 370/329 |
| 2013/0343218 A1* | 12/2013 | Pajukoski | H04B 7/024 |
| | | | 370/252 |
| 2014/0133346 A1* | 5/2014 | Kang | H04L 5/0053 |
| | | | 370/252 |
| 2014/0211767 A1* | 7/2014 | Lunttila | H04W 72/1289 |
| | | | 370/336 |

OTHER PUBLICATIONS

Second Office Action dated May 8, 2021, Chinese Application No. 201810149337.7, 5 pages.

* cited by examiner

METHOD AND APPARATUS WITH ENHANCED CONTROL MESSAGES AND SEARCH SPACE

This application claims the benefit under 35 U.S.C. §119 (e) of Provisional Appl. No. 61/555,008, filed Nov. 3, 2011 (TI-71695PS), to Provisional Appl. No. 61/557,550, filed Nov. 9, 2011 (TI-71695PS1), and to Provisional Appl. No. 61/589,935, filed Jan. 24, 2012 (TI-71695PS2), which are incorporated herein by reference in their entirety.

BACKGROUND OF THE INVENTION

The present embodiments relate to wireless communication systems and, more particularly, to the mapping of Downlink Control Information (DCI) into an enhanced Physical Downlink Control Channel (EPDCCH).

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols after it has passed through a Fast Fourier Transform (FFT). The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Reference Signals (CRS) and Dedicated or Demodulation Reference Signals (DRS). These reference signals are useful for channel estimation at the receiver. In a multi-input multi-output (MIMO) communication system with multiple transmit/receive antennas, cell-specific reference signals are not precoded and are transmitted over the entire system bandwidth. This enables a receiver to estimate an unprecoded channel. DRS are precoded with the same precoder applied to data and enable a user to estimate the precoded channel without knowing the exact precoder. DRS are present only in the same frequency where data transmission is scheduled.

Conventional cellular communication systems operate in a point-to-point single-cell transmission fashion where a user terminal or equipment (UE) is uniquely connected to and served by a single cellular base station (eNB or eNodeB) at a given time. An example of such a system is the 3GPP Long-Term Evolution (LTE Release-8). Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system (Release-10 and beyond). This greatly improves received signal strength at the UE by transmitting the same signal to each UE from different base stations. This is particularly beneficial for cell edge UEs that observe strong interference from neighboring base stations. With CoMP, the interference from adjacent base stations becomes useful signals and, therefore, significantly improves reception quality. Hence, UEs in CoMP communication mode will get much better service if several nearby cells work in cooperation.

Figure 1:
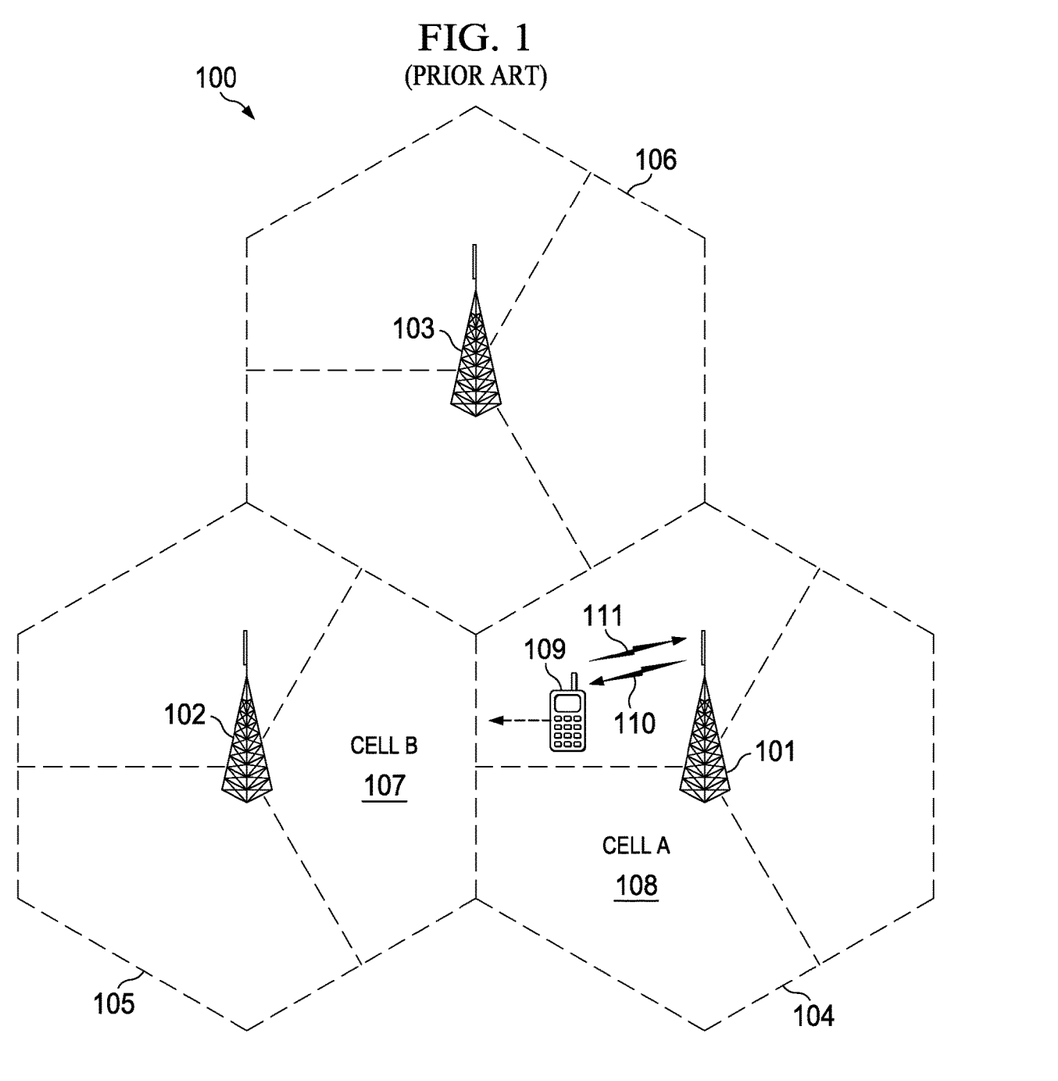
FIG. 1 is a diagram of a wireless communication system of the prior art.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 (eNB) is operable over corresponding coverage areas 104, 105, and 106. Each base station's coverage area is further divided into cells. In the illustrated network, each base station's coverage area is divided into three cells. A handset or other user equipment (UE) 109 is shown in cell A 108. Cell A 108 is within coverage area 104 of base station 101. Base station 101 transmits to and receives transmissions from UE 109. As UE 109 moves out of Cell A 108 into Cell B 107, UE 109 may be handed over to base station 102. Because UE 109 is synchronized with base station 101, UE 109 can employ non-synchronized random access to initiate a handover to base station 102. UE 109 also employs non-synchronous random access to request allocation of uplink 111 time or frequency or code resources. If UE 109 has data ready for transmission, which may be traffic data, a measurements report, or a tracking area update, UE 109 can transmit a random access signal on uplink 111. The random access signal notifies base station 101 that UE 109 requires uplink resources to transmit the UE's data. Base station 101 responds by transmitting to UE 109 via downlink 110 a message containing the parameters of the resources allocated for the UE 109 uplink transmission along with possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval. Base station 101 configures UE 109 for periodic uplink sounding reference signal (SRS) transmission. Base station 101 estimates uplink channel quality information (CQI) from the SRS transmission.

Figure 2:
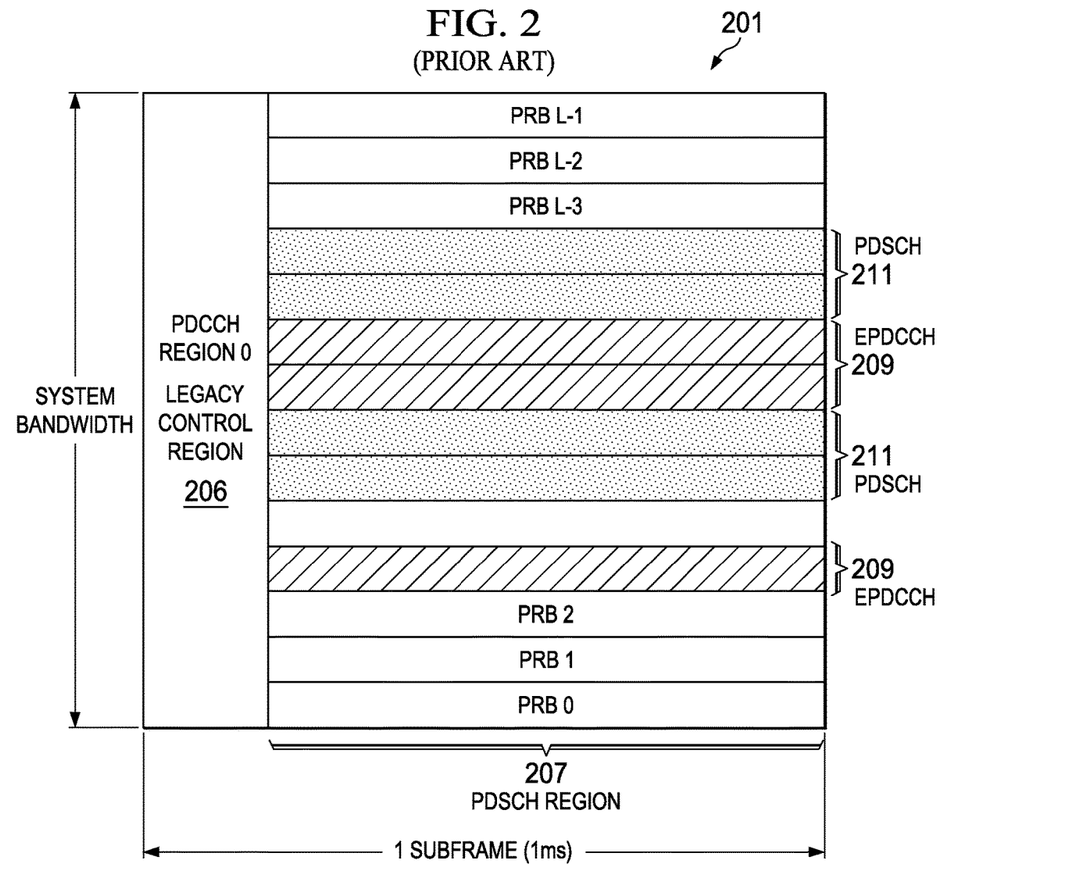
FIG. 2 is a diagram of an LTE downlink subframe of the prior art.

Downlink transmission in Long Term Evolution (LTE) is organized in subframes. Referring now to FIG. 2, there is a diagram of a downlink subframe in LTE. Each subframe 201 is of 1 ms time duration. Each subframe comprises twelve OFDM symbols with Extended Cyclic Prefix (CP) or fourteen OFDM symbols with Normal Cyclic Prefix (CP). Each OFDM symbol consists of a plurality of L Physical Resource Blocks (PRB), where each PRB is composed of twelve OFDM tones. The PRB is the smallest frequency-domain resource allocation unit in LTE, where data transmission to a user is scheduled on one or multiple PRBs. Different PRBs in one subframe 201 are allocated for data transmission to different users. Furthermore, the set of PRBs on which a user receives downlink data transmission may change from one subframe to another.

In addition to downlink data, a base station also needs to transmit control information to mobile users. This includes both common control information as well as user-specific control information. Common control information is transmitted to all users in the cell, which maintains users' connection to the network, pages users in idle mode when a call comes in, schedules random access response, and indicates critical system information changes in the cell. In addition, user-specific control information is transmitted to each scheduled user, for example, to indicate the frequency resources on which the UE is expected to receive downlink data or transmit uplink data. In LTE, each subframe is divided into legacy control region 206 for downlink control information transmission and data region 207 for downlink data transmissions. The legacy control region 206 comprises OFDM symbols 1-3 when system bandwidth is greater than 10 PRBs and OFDM symbols 2-4 otherwise. The exact size of the legacy control region is signaled on a Physical Downlink Control Format Indicator Channel (PCFICH). The data channel region 207 is located after the legacy control channel region 206 and is allotted for each Physical Resource Block (PRB). The legacy control channel region 206 is a region to which a Physical Downlink Control Channel (PDCCH) is mapped. The data channel region 207 is a region to which a Physical Downlink Shared Channel (PDSCH) is mapped and carries downlink data transmission to mobile users. Further, an Enhanced Physical Downlink Control Channel (EPDCCH) 209 is frequency multiplexed with the data channel (PDSCH) 211 to be transmitted. That is, the EPDCCH 209 is mapped to the data channel region 207 together with the PDSCH 211 using orthogonal frequency domain multiplexing. The reason to locate the legacy control channel region at the beginning of the subframe is that a UE firstly receives a PDCCH allotted to the legacy control channel region 206 to recognize the presence of transmission of the PDSCH. Once the presence of transmission of the PDSCH is recognized, the UE may determine whether to perform a receiving operation of the PDSCH. If no PDCCH is transmitted to the UE, it is unnecessary to receive the PDSCH mapped to the data channel region 207. Accordingly, the UE may save power consumed in a receiving operation of the PDSCH. Meanwhile, the UE may receive a PDCCH located at the control channel region faster than the PDSCH 211 to reduce a scheduling delay. However, because the PDCCH is transmitted over the entire system bandwidth, interference control is impossible.

The legacy control channel region 206 may not be changed to a frequency multiplexing structure to maintain compatibility with an existing or legacy UE. However, if the eNodeB does not allot a corresponding region of the data channel region 207 to a UE of a previous LTE version, the UE of a previous LTE version does not receive a resource mapped to a corresponding data channel region 207. Accordingly, the eNodeB may transmit an EPDCCH 209 for a UE of a new LTE version to a data channel region 207 that is not allotted to the UE. In other words, an EPDCCH being a control channel for a UE of a new LTE version has a structure multiplexed with the PDSCH.

While the preceding approaches provide steady improvements in wireless communications, the present inventors recognize that still further improvements in transmission of control information such as Downlink Control Indicators (DCI) are possible. Accordingly, the preferred embodiments described below are directed toward this as well as improving upon the prior art.

BRIEF SUMMARY OF THE INVENTION

In a preferred embodiment of the present invention, there is disclosed a method of mapping control information in a wireless communication system. The method includes forming a subframe having a bandwidth and having plural regions. The method further includes determining a communication mode with a remote user equipment. Control information specific to the user equipment is mapped into a first region of the subframe. Control information common to plural user equipments is mapped into a second region of the subframe. The subframe is transmitted to the user equipments.

DETAILED DESCRIPTION OF THE INVENTION

Inter-channel interference is a significant problem in a control channel of an LTE wireless communication system. Moreover, it is not possible to employ frequency domain inter-cell interference cancellation (ICIC) for legacy control information transmission in the PDCCH, because the PDCCH is distributed across the entire system bandwidth. Accordingly, the present invention employs common and UE-specific control information in a new subframe structure to maintain backward compatibility with legacy communication systems and to facilitate ICIC as will be explained in detail.

The following abbreviations are used throughout the instant specification.
eNB: E-UTRAN Node B or base station
UE: User equipment
RNTI: Radio Network Temporary Indicator
DCI: Downlink Control Indicator
PDCCH: Physical Downlink Control CHannel
EPDCCH: Enhanced Physical Downlink Control CHannel
PCFICH: Physical Control Format Indicator CHannel
DMRS: Demodulation Reference Symbol or UE-specific Reference Symbol
CRS: Cell-specific Reference Symbol LTE: Long Term Evolution
DL: DownLink
UL: UpLink
RRC: Radio Resource Control
PRB: Physical Resource Block
TPC: Transmit Power Control Scheduling in a wireless network is achieved by the base station (eNB in LTE) transmitting downlink control information to mobile terminals (UE in LTE). In a cellular wireless network, a base station may need to schedule transmissions to multiple mobile users at the same time. As a result, the base station needs to transmit downlink control information to different users simultaneously. It is also possible that the base station may transmit different types of control information to a UE simultaneously, such as common control information and UE-specific control information.

In LTE, downlink control information bits are carried in a Downlink Control Information (DCI) format. A DCI is channel encoded, modulated, and transmitted in a specific physical transmission channel over an air interface. In a legacy system, DCI formats are transmitted by the Physical Downlink Control Channel (PDCCH). A PDCCH is transmitted in the legacy PDCCH region in each subframe. Different DCI formats are used for different scheduling purposes. DCI can be used to transmit common control information to all users in a cell, UE-specific downlink control information to schedule PDSCH data transmission to a UE, or UE-specific downlink control information to schedule uplink data transmission from the UE to the eNB.

Table I below is a relation between DCI formats and corresponding downlink transmission modes. The DCI formats are UE-specific, monitored by UEs, and scrambled by C-RNTI.

| DL Mode | DCI format | Transmission scheme |
| --- | --- | --- |
| Mode 1 | DCI 1A | Single antenna port with cell-specific reference signal (CRS) port 0 |
| Mode 2 | DCI 1 | Transmit diversity |
| Mode 3 | DCI 2A | Open-loop spatial multiplexing |
| Mode 4 | DCI 2 | Closed-loop spatial multiplexing |
| Mode 5 | DCI 1D | Single-layer multiuser MIMO with CRS |
| Mode 6 | DCI 1B | Single-layer closed-loop precoding with CRS |
| Mode 7 | DCI 1 | Single-layer beamforming with demodulation reference symbol (DMRS) port 5 |
| Mode 8 | DCI 2B | Dual-layer spatial multiplexing with DMRS ports 7-8 |
| Mode 9 | DCI 2C | 8-layer spatial multiplexing with DMRS ports 7-14 |
| Mode 10 | DCI 2D | Coordinated Multi-Point communication, 8-layer spatial multiplexing with DMRS ports 7-14 |

Table II below is a relation between DCI formats and corresponding uplink transmission modes. The DCI formats are UE-specific, monitored by UEs, and scrambled by C-RNTI.

| DL Mode | DCI format | Transmission scheme |
| --- | --- | --- |
| Mode 1 | DCI 0 | Single antenna port transmission |
| Mode 2 | DCI 0 | Single antenna port transmission |
|  | DCI 4 | Multi-antenna port transmission |

Figure 3:
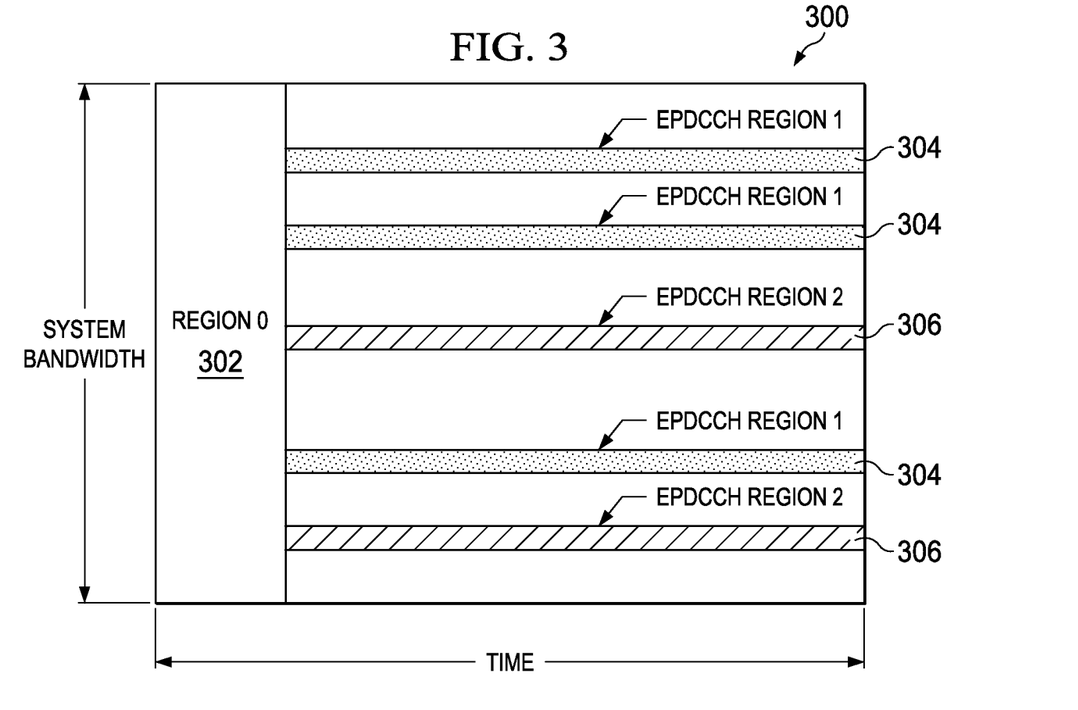
FIG. 3 is a diagram of a downlink subframe showing multiple regions for a single user equipment (UE)

Referring now to FIG. 3, there is a diagram of a subframe 300 showing multiple regions that may be assigned by eNB for single user equipment (UE). The subframe includes PDCCH region 0 (302) and physical resource blocks (PRB) in EPDCCH regions 1 (304), and EPDCCH regions 2 (306). The present invention is directed to a method for assigning common and UE-specific downlink control indicators (DCI) to various regions of the subframe for uplink and downlink scheduling to UEs capable of receiving control information on the EPDCCH.

The eNB may configure one or two EPDCCH regions in the downlink. Each EPDCCH region comprises a subset of PRBs which are semi-statically configured by radio resource control (RRC) higher layer signals. For each UE, the configured EPDCCH region 1 and EPDCCH region 2 may be orthogonal or partially overlapping. EPDCCH regions 1 and 2 are configured in a UE-specific manner and could be identical or different for different users.

In each subframe, the UE needs to monitor DCI formats corresponding to common control information as well as DCI formats corresponding to UE-specific downlink and uplink scheduling information.

For monitoring of UE-specific downlink scheduling information, DCI formats may be divided into several groups. Dedicated DCI formats 1/1A/1B/1D/2/2A/2B/2C/2D carry a UE-specific downlink scheduling assignment. The UE monitors for one of a set of DCI formats 1/1A/1B/1D/2/2A/2B/2C/2D depending on the configured transmission mode. The set also includes any new DCI format that may be specified for further enhancements to MIMO transmission. The UE always monitors for DCI format 1A which is used to schedule UE fallback communication using spatial transmit diversity. DCI format 1A has the same size as DCI format 0, which carries an uplink grant. DCI for downlink scheduling is called a DL grant. The downlink grant is scrambled by the specific UE identification Cell-RNTI (C-RNTI). Thus, only the UE with the correct C-RNTI can decode the downlink grant. Furthermore, the DCI format that a UE monitors is uniquely determined by the downlink transmission mode (Table I) as semi-statically configured by radio resource control (RRC) signaling.

For monitoring of UE-specific uplink scheduling information, DCI for uplink scheduling is called a UL grant. The uplink grant is also scrambled by the specific UE identification (C-RNTI). Thus, only the UE with the correct C-RNTI can decode the uplink grant. Furthermore, the DCI format that a UE monitors is uniquely determined by the uplink transmission mode (Table II) as semi-statically configured by radio resource control (RRC) signaling. If a UE is configured in single-antenna transmission mode in the uplink, the UE monitors for DCI format 0 carrying a UL grant. If the UE is configures in a multi-antenna transmission mode in the uplink, the UE monitors for both DCI format 0 and DCI format 4 carrying the UL grant. As can be seen, the UE always needs to monitor DCI 0 for a UL grant.

There are also common DCI formats which are transmitted to all UEs within a cell. For example, Group 1 DCI formats 3/3A, which are the same size as DCI formats 0/1A, are for group power control. Group 2 DCI formats 1A/1C are for paging, random access response, or system information. DCI formats 1A/1C, when scrambled by P-RNTI, are used for the UE to receive paging. DCI formats 1A/1C, when scrambled by RA-RNTI, are used for the UE to receive random access response. DCI formats 1A/1C, when scrambled by SI-RNTI, are used for the UE to receive system information. DCI formats 3/3A, when scrambled by TPC-RNTI, are used for the UE to receive transmit power control (TPC) information.

One UE may need to monitor multiple DCIs in one subframe. The UE needs to blindly decode multiple DCI formats including the DCI format for common control information, the DCI for downlink scheduling, and the DCI format for uplink scheduling. The eNB may transmit different DCIs carried by different PDCCHs to different UEs in one subframe. In a legacy LTE system, the DCI is modulated and transmitted by the PDCCH in the PDCCH region.

In LTE Release 11, a new physical channel called Enhanced Physical Downlink Control Channel (EPDCCH) is defined to transmit downlink control information in a cell. As an additional physical resource for control information, EPDCCH is transmitted in a subset of physical resource blocks (PRB) in the data region 1 (304) and outside of the legacy PDCCH control region 0 (302). The objective of EPDCCH is to increase the control channel capacity due to the proliferation of mobile users in the wireless network. Secondly, EPDCCH is transmitted by demodulation reference symbol (DMRS)-based beamforming, achieving more flexible beamforming gain enabled by large scale MIMO array. Thirdly, because EPDCCH is transmitted in a few PRBs in the system bandwidth, frequency domain Inter-cell Interference Coordination (ICIC) is achieved. Neighboring cells creating strong inter-cell interference may transmit their EPDCCHs in orthogonal PRBs so as to avoid interference on the control channel.

Returning now to FIG. 3, in a legacy LTE system, downlink control indicators (DCI) are transmitted in PDCCH region 0 (302). The PDCCH region 302 includes OFDM symbols 1-3 of the entire system bandwidth in each subframe if the system bandwidth is greater than 1.4 MHz. Otherwise, the PDCCH region 302 includes OFDM symbols 2-4 of the entire system bandwidth in each subframe if the system bandwidth is less than or equal to 1.4 MHz. The legacy PDCCH in LTE Rel. 8-10 is designed with CRS-based transmission. The DCI is channel encoded, modulated with 4-QAM modulation, and transmitted in one PDCCH. A PDCCH is precoded with 1/2/4-Tx transmit diversity, cross-interleaved with other PDCCHs and then transmitted in the entire system bandwidth over the legacy control region of a subframe. Through CRS-based transmit diversity and cross-interleaving, legacy PDCCH exploits the spatial and frequency diversity to maximize the robustness of the control channel and ensures its reliable reception and coverage in a cell. The shortcoming of the PDCCH is that it is distributed over the entire system bandwidth of a subframe and cannot enjoy frequency domain ICIC. As previously discussed, when a UE receives strong inter-cell interference from a neighboring node, it is not possible to perform frequency domain ICIC because the PDCCH is distributed across the system bandwidth.

Figure 4:
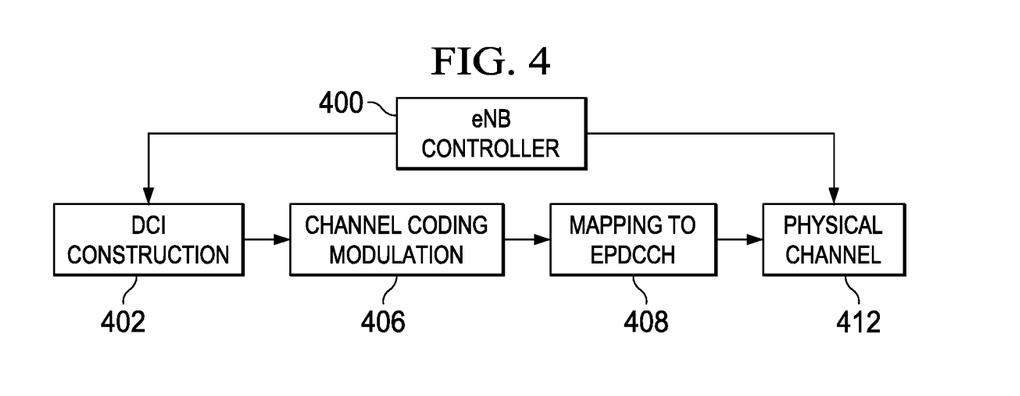
FIG. 4 is a simplified block diagram of a base station (eNB) according to the present invention.

Referring now to FIG. 4, there is a simplified block diagram of a base station (eNB) according to the present invention. The base station includes eNB controller 400, which directs operation of the base station for both downlink and uplink operation. In particular, eNB controller 400 generates UE-specific DCI formats carrying UE-specific control information according to a specific transmission mode (Tables 1 and II) and/or common control information at step 402. Each DCI is channel encoded, modulated, at step 406 and mapped to an EPDCCH at step 408. Each EPDCCH is mapped and transmitted in a specific EPDCCH region at step 412. The mapping of EPDCCHs in different EPDCCH regions by eNB controller 400 will now be discussed in detail with reference to the flow charts of FIGS. 5-9.

Figure 5:
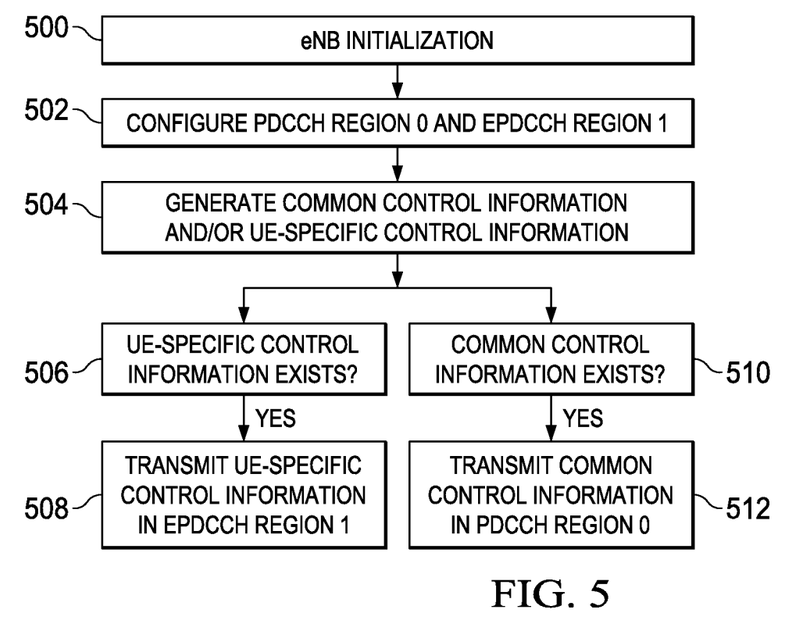
FIG. 5 is a flow chart showing construction of PDCCH region 0 and EPDCCH region 1 of the subframe of FIG. 3.

Turning now to FIG. 5, there is a flow chart showing construction of PDCCH region 0 and EPDCCH region 1 of the subframe of FIG. 3. Here and in the following discussion, the same identification numerals are used to indicate similar features. The eNB is initialized at step 500 with instructions to configure PDCCH region 0 and EPDCCH region 1 at step 502. EPDCCH region 1 comprises a set of PRBs which may be signaled to the UE with a bitmap or other comparable signaling method. The PRBs are arranged in pairs, each pair occupying a first and second time slot of the subframe. The bitmap preferably defines which PRB pair is for each UE. The bitmap may also define which subframe of a frame is for each UE. The eNB preferably transmits the bitmap to each UE by higher level Radio Resource Control (RRC) when necessary. This bitmap is highly advantageous in permitting the UE to conserve power and only decode relevant PRBs and subframes. At step 504, the controller generates DCIs for common control information and/or UE-specific control information. At step 506, the controller determines if UE-specific control information exists. If so, the UE-specific control information will be transmitted by EPDCCH in EPDCC region 1 at step 508. At step 510, the controller determines if common control information exists. If so, the common control information will be transmitted by PDCCH in PDCCH region 0 at step 512.

Figure 6:
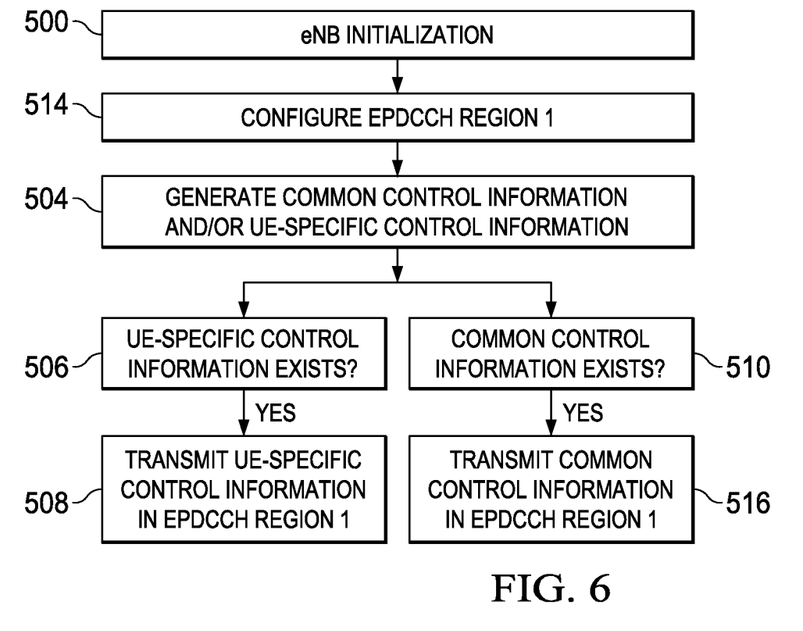
FIG. 6 is a flow chart showing construction of common control EPDCCH region 1 and UE-specific control EPDCCH region 1 of the subframe of FIG. 3.

Referring next to FIG. 6, there is a flow chart showing construction of common control EPDCCH region 1 and UE-specific control EPDCCH region 1 of the subframe of FIG. 3. This embodiment describes a scenario where there is no legacy PDCCH control region. An example of this scenario is a New Carrier Type that may be defined for a future LTE version. As such, both common control and UE-specific control information shall be transmitted on the EPDCCH region 1. The eNB is initialized at step 500 with instructions to configure EPDCCH region 1 at step 514. At step 504, the controller generates DCIs for common control information and/or UE-specific control information. At step 506, the controller determines if UE-specific control information exists. If so, the UE-specific control information will be transmitted by EPDCCH in EPDCCH region 1 at step 508. At step 510, the controller determines if common control information exists. If so, the common control information will be transmitted in EPDCCH region 1 at step 516.

Figure 7:
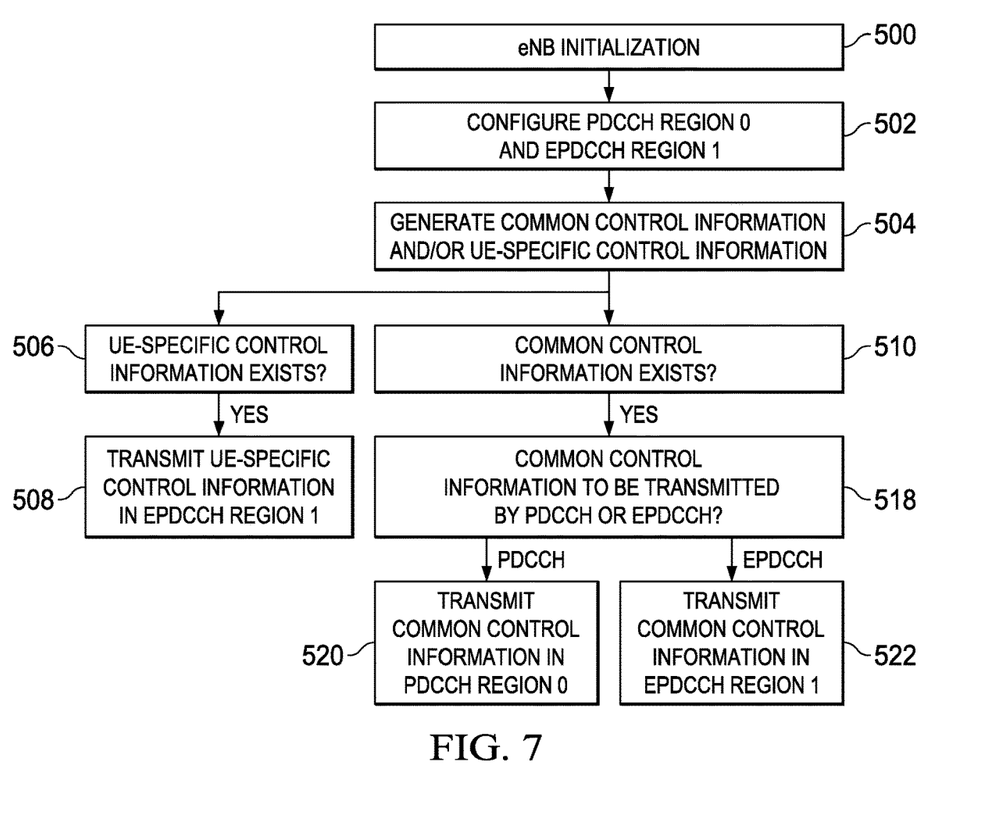
FIG. 7 is a flow chart showing construction of common control PDCCH region 0 or EPDCCH region 1 and UE-specific control EPDCCH region 1 of the subframe of FIG. 3.

At FIG. 7, there is a flow chart showing construction of common control regions 0 and 1 and UE-specific control EPDCCH region 1 of the subframe of FIG. 3. The eNB is initialized at step 500 with instructions to configure PDCCH region 0 and EPDCCH region 1 at step 502. At step 504, the controller generates DCIs for common control information and/or UE-specific control information. At step 506, the controller determines if UE-specific control information exists. If so, the UE-specific control information will be transmitted by EPDCCH in EPDCCH region 1 at step 508. At step 510, the controller determines if common control information exists. If so, controller determines at step 518 if the common control information should be inserted in the PDCCH region 0 or EPDCCH region 1 based on the type of the common control information. In one embodiment, if the common control information carries TPC information scheduled by DCI format 3/3A, it is transmitted by EPDCCH in EPDCCH region 1 at step 522. Otherwise it is transmitted by PDCCH in PDCCH region 0 at step 520. Blind decoding is not increased because DCI format 3/3A is the same size as DCI format 0/1A, which the UE always monitors. In another embodiment, if the common control information carries TPC information scheduled by DCI format 3/3A or paging or system information, and/or random access response scheduled by DCI format 1C, it is transmitted by EPDCCH in EPDCCH region 1 at step 522. Otherwise it is transmitted by PDCCH in PDCCH region 0 at step 520. This increases the number of blind decoding operations, as DCI format 1C has a different size than DCI format 0/1A.

Figure 8:
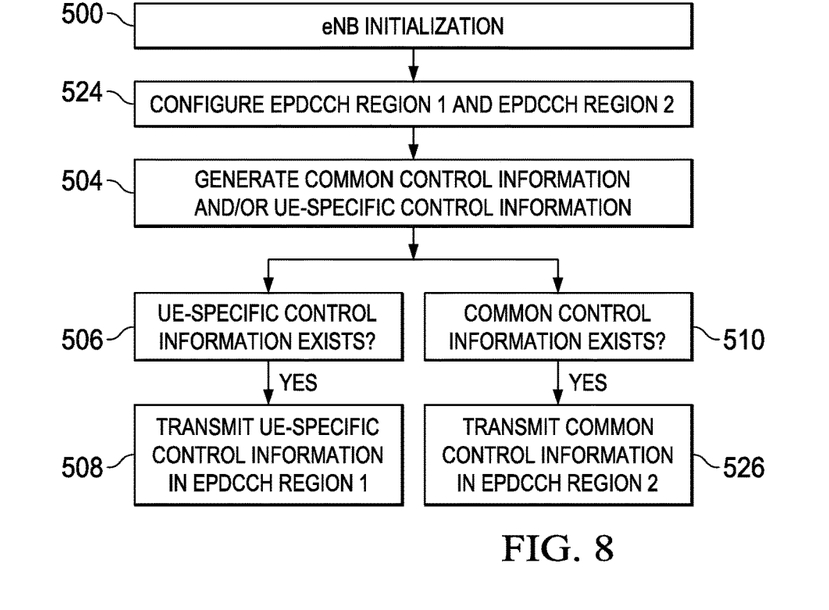
FIG. 8 is a flow chart showing construction of common control EPDCCH region 2 and UE-specific control EPDCCH region 1 of the subframe of FIG. 3.

At FIG. 8, there is a flow chart showing construction of EPDCCH region 1 and EPDCCH region 2 of the subframe of FIG. 3. The eNB is initialized at step 500 with instructions to configure EPDCCH region 1 and EPDCCH region 2 at step 524. Each EPDCCH region (1 and 2) comprises a set of PRBs which, for example, can be signaled to the UE by a bitmap or comparable signaling method as previously discussed. At step 504, the controller generates DCIs for common control information and/or UE-specific control information. At step 506, the controller determines if UE-specific control information exists. If so, the UE-specific control information will be transmitted by EPDCCH in EPDCCH region 1 at step 508. At step 510, the controller determines if common control information exists. If so, the common control information will be transmitted by EPDCCH in EPDCCH region 2 at step 526.

Figure 9:
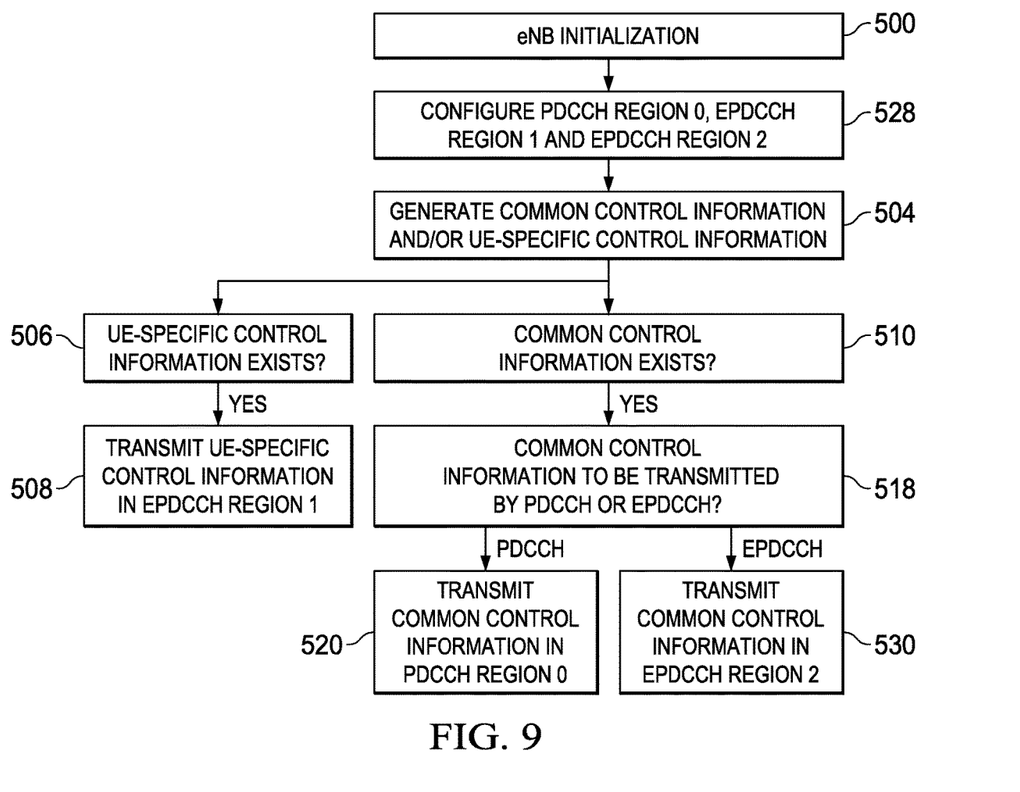
FIG. 9 is a flow chart showing construction of common control PDCCH region 0 or EPDCCH region 2 and UE-specific control EPDCCH region 1 of the subframe of FIG. 3.

At FIG. 9, there is a flow chart showing construction of common control regions 0 and 2 and UE-specific control EPDCCH region 1 of the subframe of FIG. 3. The eNB is initialized at step 500 with instructions to configure PDCCH region 0 and EPDCCH regions 1 and 2 at step 528. At step 504, the controller generates DCIs for common control information and/or UE-specific control information. At step 506, the controller determines if UE-specific control information exists. If so, the UE-specific control information will be transmitted by EPDCCH in EPDCCH region 1 at step 508. At step 510, the controller determines if common control information exists. If so, controller determines at step 518 if the common control information should be transmitted by PDCCH in PDCCH region 0 or by EPDCCH in EPDCCH region 2 based on the type of control information. In one embodiment, if the control information carries TPC information scheduled by DCI format 3/3A, it is transmitted by EPDCCH in EPDCCH region 1 at step 522. Otherwise it is transmitted by PDCCH in PDCCH region 0 at step 520. Blind decoding is not increased, because DCI format 3/3A has the same size as DCI format 0/1A which the UE always monitors. In another embodiment, if the common control information carries TPC information scheduled by DCI format 3/3A or paging or system information, and random access response is scheduled by DCI format 1C, it is transmitted by PDCCH in PDCCH region 0 at step 520. This, however, increases the number of blind decoding operations, as DCI format 1C has a different size than DCI format 0/1A.

Figure 10:
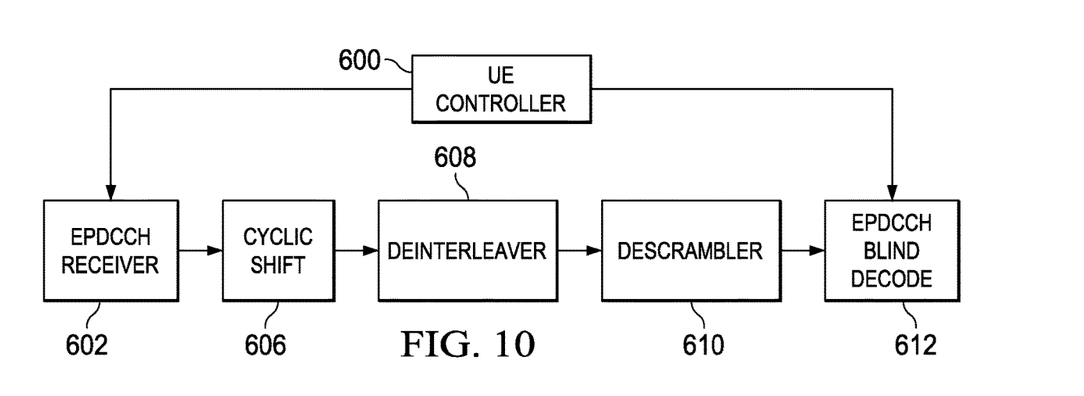
FIG. 10 is a simplified block diagram of a user equipment (UE) according to the present invention.

Referring now to FIG. 10, there is a simplified block diagram of user equipment (UE) according to the present invention. The UE includes UE controller 600, which directs operation of the UE for both downlink and uplink operation. In particular, UE controller 600 directs EPDCCH receiver 602 to receive DCI formats according to a specific transmission mode (Tables 1 and II). PRBs of the EPDCCH are then cyclic shifted by cyclic shifter 606, deinterleaved by deinterleaver 608, and descrambled by descrambler 610. At step 612, UE controller 600 directs blind decoding 612 of the resulting DCI formats in the EPDCCH. Operation of the UE formats as directed by UE controller 600 will now be discussed in detail with reference to the flow charts of FIGS. 11-15.

Figure 11:
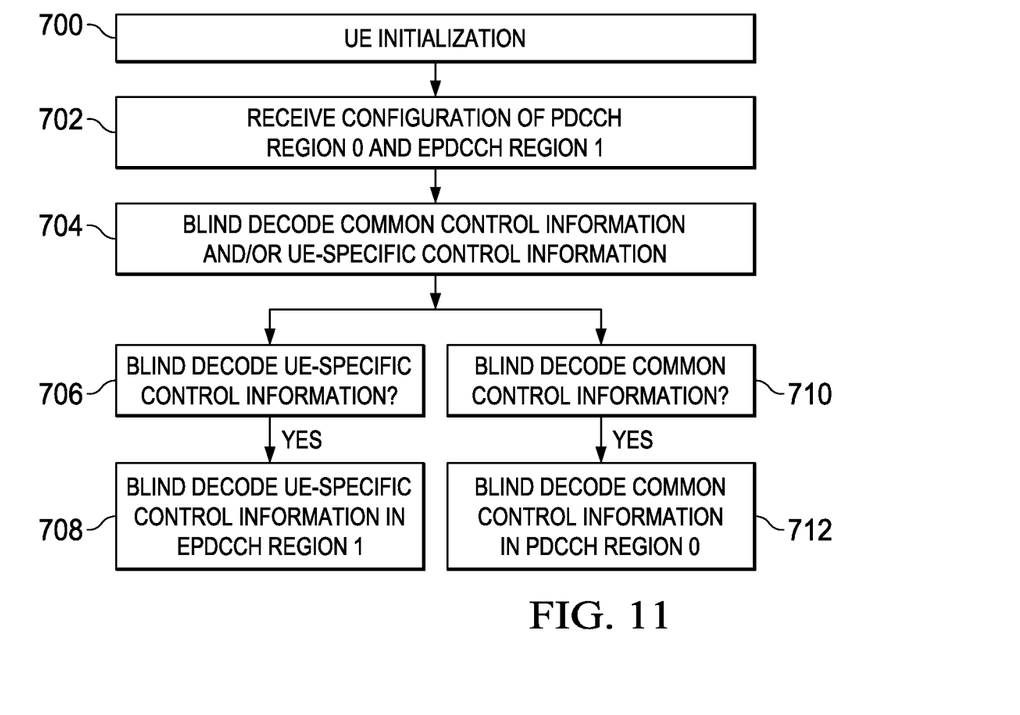
FIG. 11 is a flow chart showing decoding of common control PDCCH region 0 and UE-specific control EPDCCH region 1 of the subframe of FIG. 3.

Turning now to FIG. 11, there is a flow chart showing decoding of common control PDCCH region 0 and UE-specific control EPDCCH region 1 of the subframe of FIG. 3. The UE is initialized at step 700 to receive a configuration of PDCCH region 0 and EPDCCH region 1 at step 702. At step 704, the controller directs blind decoding of common control information and/or UE-specific control information. At step 706, the controller determines if there is UE-specific control information to decode. If so, the UE-specific control information in EPDCCH region 1 will be blind decoded at step 708. At step 710, the controller determines if common control information exists. If so, the common control information in PDCCH region 0 will be blind decoded at step 712.

Figure 12:
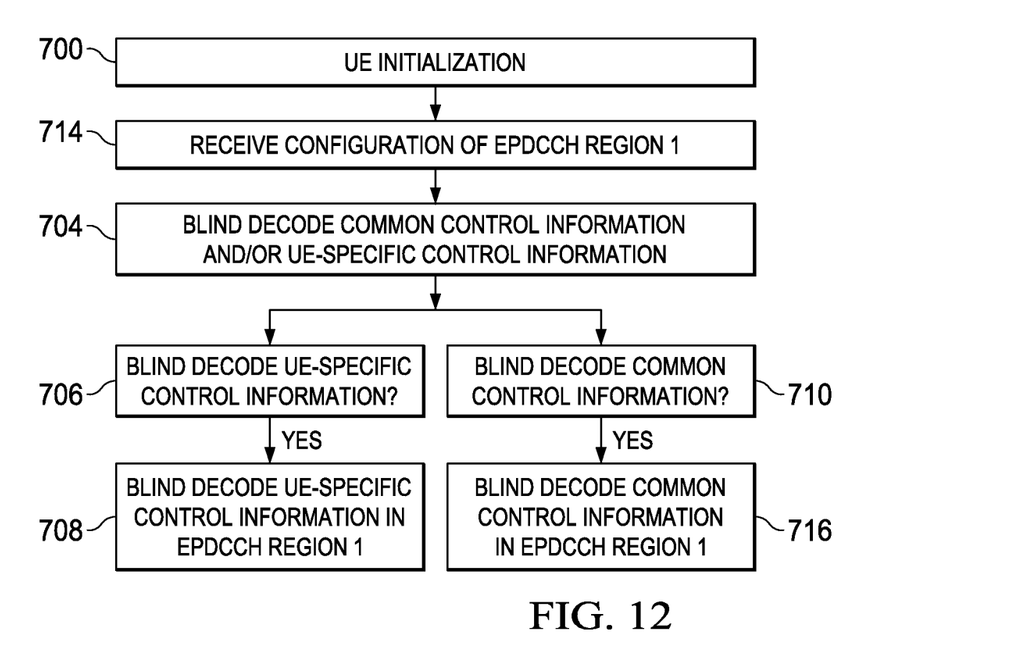
FIG. 12 is a flow chart showing decoding of common control EPDCCH region 1 and UE-specific control EPDCCH region 1 of the subframe of FIG. 3.

Referring next to FIG. 12, there is a flow chart showing decoding of common control EPDCCH region 1 and UE-specific control EPDCCH region 1 of the subframe of FIG. 3. The UE is initialized at step 700 to receive a configuration of EPDCCH region 1 at step 714. At step 704, the controller directs blind decoding of common control information and/or UE-specific control information. At step 706, the controller determines if there is UE-specific control information to decode. If so, the UE-specific control information in EPDCCH region 1 will be blind decoded at step 708. At step 710, the controller determines if common control information exists. If so, the common control information in EPDCCH region 1 will be blind decoded at step 716.

Figure 13:
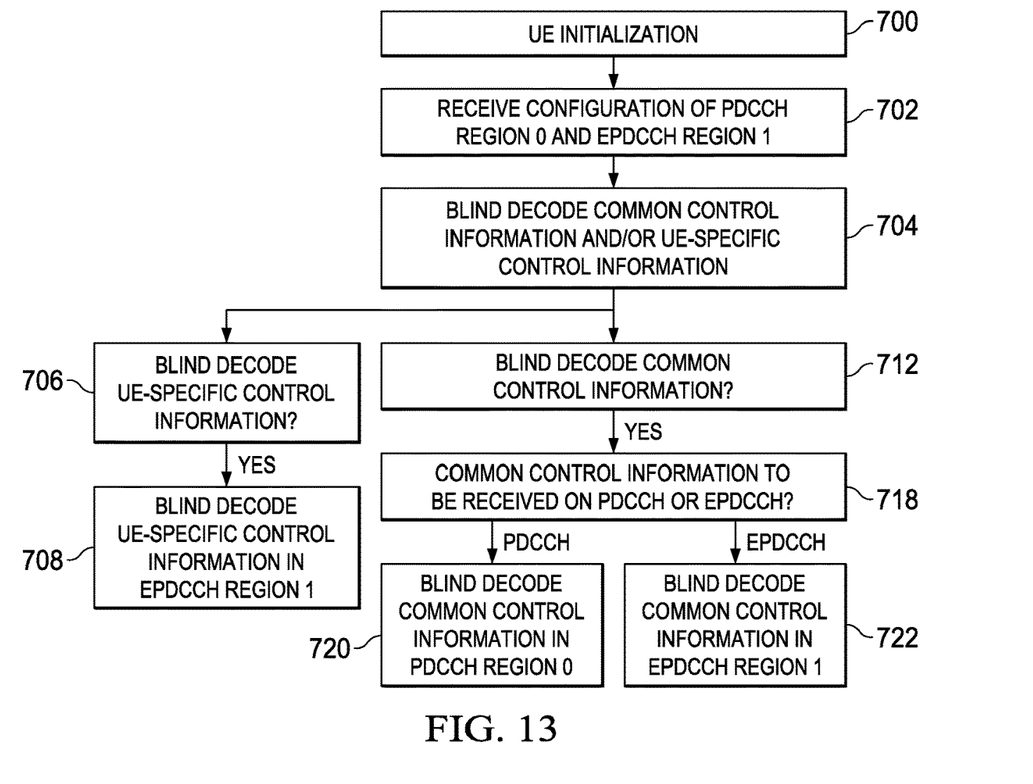
FIG. 13 is a flow chart showing decoding of common control PDCCH region 0 or EPDCCH region 1 and UE-specific control EPDCCH region 1 of the subframe of FIG. 3.

At FIG. 13, there is a flow chart showing decoding of common control PDCCH region 0 or EPDCCH region 1 and UE-specific control EPDCCH region 1 of the subframe of FIG. 3. The UE is initialized at step 700 to receive a configuration of PDCCH region 0 and EPDCCH region 1 at step 702. At step 704, the controller directs blind decoding of common control information and/or UE-specific control information. At step 706, the controller determines if there is UE-specific control information to decode. If so, the UE-specific control information in EPDCCH region 1 will be blind decoded at step 708. At step 712, the controller determines if common control information exists. If so, the controller determines at step 718 if the common control information is in PDCCH region 0 or EPDCCH region 1 based on the communication mode (Table II). At step 720, the controller directs blind decoding of common control information in PDCCH region 0. At step 722, the controller directs blind decoding of common control information in EPDCCH region 1.

Figure 14:
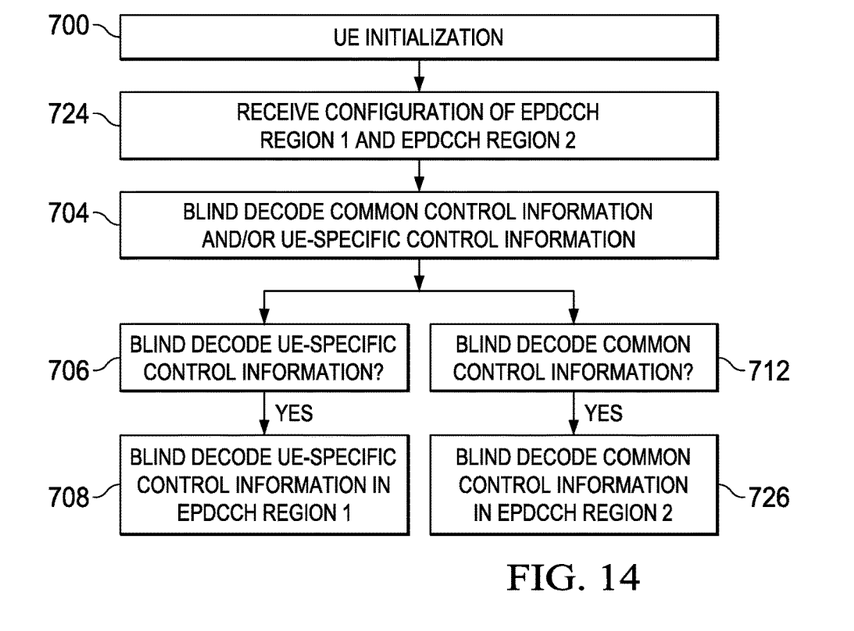
FIG. 14 is a flow chart showing decoding of common control EPDCCH region 2 and UE-specific control EPDCCH region 1 of the subframe of FIG. 3.

At FIG. 14, there is a flow chart showing decoding of common control EPDCCH region 2 and UE-specific control EPDCCH region 1 of the subframe of FIG. 3. The UE is initialized at step 700 to receive a configuration of EPDCCH region 2 and EPDCCH region 1 at step 702. At step 704, the controller directs blind decoding of common control information and/or UE-specific control information. At step 706, the controller determines if there is UE-specific control information to decode. If so, the UE-specific control information in EPDCCH region 1 will be blind decoded at step 708. At step 712, the controller determines if common control information exists. If so, the common control information in EPDCCH region 2 will be blind decoded at step 726.

Figure 15:
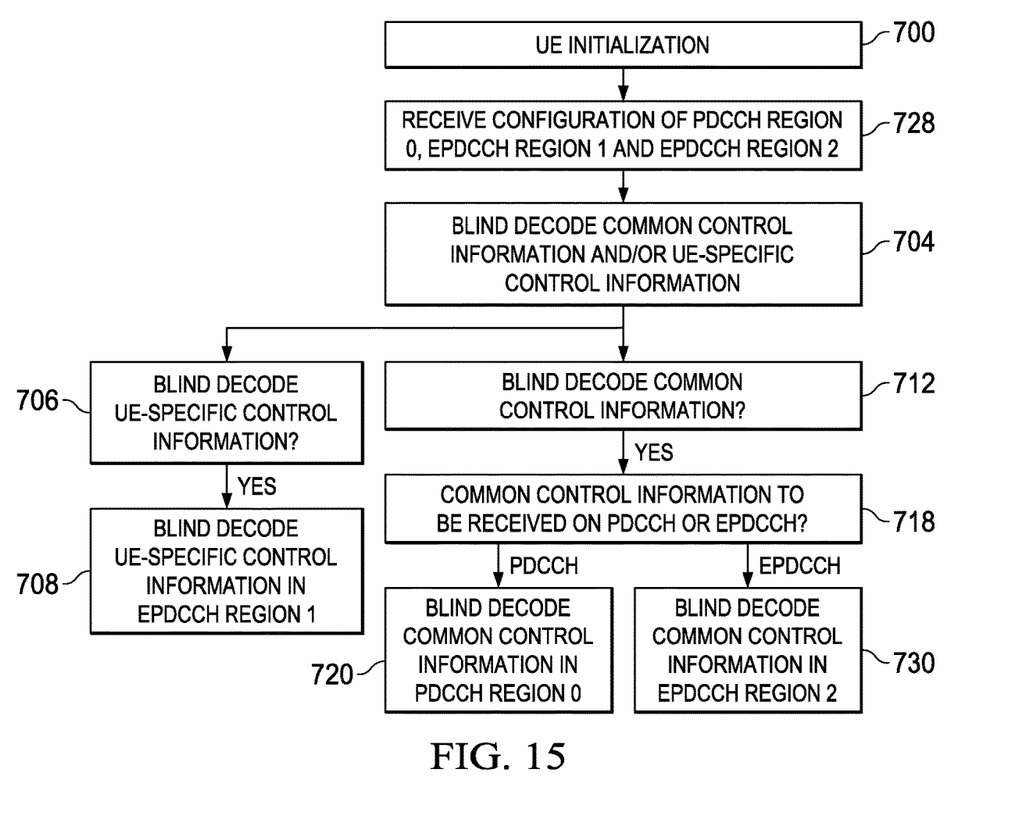
FIG. 15 is a flow chart showing decoding of common control PDCCH region 0 or EPDCCH region 2 and UE-specific control EPDCCH region 1 of the subframe of FIG. 3.

At FIG. 15, there is a flow chart showing decoding of common control PDCCH region 0 or EPDCCH region 2 and UE-specific control EPDCCH region 1 of the subframe of FIG. 3. The UE is initialized at step 700 to receive a configuration of PDCCH region 0, EPDCCH region 1, and EPDCCH region 2 at step 702. At step 704, the controller directs blind decoding of common control information and/or UE-specific control information. At step 706, the controller determines if there is UE-specific control information to decode. If so, the UE-specific control information in EPDCCH region 1 will be blind decoded at step 708. At step 712, the controller determines if common control information exists. If so, the controller determines at step 718 if the common control information is in PDCCH region 0 or EPDCCH region 2 based on the communication mode (Table II). At step 720, the controller directs blind decoding of common control information in PDCCH region 0. At step 730, the controller directs blind decoding of common control information in EPDCCH region 2.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of mapping control information for wireless communication, comprising:
    forming a subframe having a bandwidth;
    mapping first control information specific to a user equipment (UE1) into a first enhanced physical downlink control channel (EPDCCH) of the subframe, wherein the first control information is formatted according to downlink control information (DCI) format 1A with CRC scrambled by a cell radio network temporary identifier (C-RNTI), the first EPDCCH corresponding to a first set of resource blocks configured by a Radio Resource Control (RRC) message;
    mapping second control information common to UE1 and at least another user equipment (UE2) into a second EPDCCH of the subframe, wherein the second control information has a DCI formed with CRC scrambled by a second type of RNTI different than the C-RNTI, the second EPDCCH corresponding to a second set of resource blocks configured by the RRC message;
    mapping third control information into a physical downlink control channel (PDCCH) of the subframe, wherein the third control information is formatted according to DCI format 1A with CRC scrambled by a system information radio network temporary identifier (SI-RNTI); and
    transmitting the subframe to UE1 and UE2.

2. The method of claim 1, wherein mapping the first control information includes determining a mapping of the first control information into the first EPDCCH in response to a type of common control information.

3. The method of claim 2, wherein the second control information is transmit power control (TPC) information.

4. The method of claim 1, wherein the subframe comprises a plurality of Physical Resource Block (PRB) pairs, and wherein a location of the first EPDCCH and a location of the second EPDCCH is indicated by a bitmap.

5. The method of claim 4, wherein the bitmap has a length at least equal a total number of PRB pairs in the subframe.

6. A method of receiving control information by a user equipment (UE1), comprising:
    receiving a configuration of a subframe from a base station;
    blind decoding a first enhanced physical downlink control channel (EPDCCH) of the subframe to receive first control information specific to the UE1, wherein the first control information is formatted according to downlink control information (DCI) format 1A with CRC scrambled by a cell radio network temporary identifier (C-RNTI), the first EPDCCH corresponding to a first set of resource blocks configured by a Radio Resource Control (RRC) message;
    blind decoding a second enhanced physical downlink control channel (EPDCCH) of the subframe to receive second control information common to the UE1 and at least another user equipment (UE2), wherein the second control information has a DCI format with CRC scrambled by a second type of RNTI different than the C-RNTI, the second EPDCCH corresponding to a second set of resource blocks configured by the RRC message; and
    blind decoding a physical downlink control channel (PDCCH) of the subframe to receive third control information, wherein the third control information is formatted according to DCI format 1A with CRC scrambled by a system information radio network temporary identifier (SI-RNTI).

7. The method of claim 6, wherein the subframe comprises a plurality of Physical Resource Block (PRB) pairs, wherein of receiving the configuration comprises receiving a bitmap, and wherein a location of the first EPDCCH and a location of the second EPDCCH is indicated by the bitmap.

8. The method of claim 7, wherein the bitmap indicates whether a PRB pair is for UE1.

9. The method of claim 7, wherein the bitmap indicates whether a subframe is for UE1.

10. A method of communication between a base station and a plurality of user equipments (UE), comprising:
    the base station forming a subframe;
    generating first Downlink Control Information (DCI) comprising control information specific to a first UE (UE1), wherein the first control information has a DCI format with CRC scrambled by a first type of radio network temporary identifier (RNTI);
    generating second DCI comprising second control information common to UE1 and at least a second user equipment (UE2), wherein the second control information has a DCI format with CRC scrambled by a second type of RNTI different than the first type of RNTI;
    generating third DCI comprising third control information wherein the third control information is formatted according to DCI format 1A with CRC scrambled by a system information radio network temporary identifier (SI-RNTI);
    mapping the first DCI into a first Enhanced Physical Downlink Control Channel (EPDCCH) of the subframe, the first EPDCCH corresponding to a first set of resource blocks configured by a Radio Resource Control (RRC) message;
    mapping the second DCI into a second EPDCCH of the subframe, the second EPDCCH corresponding to a second set of resource blocks configured by the RRC message;
    mapping third control information into a physical downlink control channel (PDCCH) of the subframe; and
    transmitting the subframe to UE1 and UE2.

11. The method of claim 10, wherein the subframe comprises a plurality of Physical Resource Block (PRB) pairs, and wherein a location of the first EPDCCH is indicated by a bitmap having a length at least equal to a total number of PRB pairs in the subframe.

12. The method of claim 11, wherein the total number of PRB pairs is a function of a communication bandwidth between the base station and the plurality of user equipments.

13. The method of claim 10, wherein the subframe comprises a plurality of Physical Resource Block (PRB) pairs, and wherein a location of the second EPDCCH is indicated by a bitmap having a length at least equal to a total number of PRB pairs in the subframe.

14. The method of claim 13, wherein the total number of PRB pairs is a function of a communication bandwidth between the base station and the plurality of user equipments.

15. The method of claim 10, further comprising mapping the second DCI into one of the second EPDCCH or the PDCCH of the subframe, wherein the mapping is determined by a format and a scrambling of the second DCI.

16. The method of claim 15, wherein the subframe comprises a plurality of Physical Resource Block (PRB) pairs, and wherein a location of the PDCCH is indicated by a bitmap having a length at least equal to a total number of PRB pairs in the subframe.

17. The method of claim 15, wherein the total number of PRB pairs is a function of a communication bandwidth between the base station and the plurality of user equipments.

18. The method of claim 10, wherein the second DCI has a format 3 or 3A format with CRC scrambled by a Transmit Power Control Radio Network Temporary Identifier (TPC-RNTI).

19. The method of claim 10, wherein the second DCI has a format 1A with CRC scrambled by one of a System Information Radio Network Temporary Identifier (SI-RNTI), a Paging Radio Network Temporary Identifier (P-RNTI), or a Random Access Radio Network Temporary Identifier (RA-RNTI).

20. The method of claim 10, wherein the second DCI has a format 0 or 1A with CRC scrambled by a Temporary Cell Radio Network Temporary Identifier (C-RNTI).

21. The method of claim 1,
wherein the first EPDCCH has a UE-specific DCI format, and
wherein the second EPDCCH has a DCI format of 1A scrambled by one of a System Information Radio Network Temporary Identifier (SI-RNTI), a Paging Radio Network Temporary Identifier (P-RNTI), or a Random Access Radio Network Temporary Identifier (RA-RNTI) or a DCI format of format 3 or 3A with CRC scrambled by a Transmit Power Control Radio Network Temporary Identifier (TPC-RNTI).

22. The method of claim 1, wherein the second control information is transmit power control (TPC) information.

23. The method of claim 6, wherein the second control information is transmit power control (TPC) information.

24. The method of claim 6, further comprising determining a mapping of the first control information into the first EPDCCH in response to a type of common control information.

25. A user equipment (UE1), configured to:
receive a configuration of a subframe from a base station;
blind decode a first enhanced physical downlink control channel (EPDCCH) of the subframe to receive first control information specific to the UE1, wherein the first control information is formatted according to downlink control information (DCI) format 1A with CRC scrambled by a cell radio network temporary identifier (C-RNTI), the first EPDCCH corresponding to a first set of resource blocks configured by a Radio Resource Control (RRC) message;
blind decode a second enhanced physical downlink control channel (EPDCCH) of the subframe to receive second control information common to the UE1 and at least another user equipment (UE2), wherein the second control information has a DCI format with CRC scrambled by a second type of RNTI different than the C-RNTI, the second EPDCCH corresponding to a second set of resource blocks configured by the RRC message; and
blind decode a physical downlink control channel (PDCCH) of the subframe to receive third control information, wherein the third control information is formatted according to DCI format 1A with CRC scrambled by a system information radio network temporary identifier (SI-RNTI).

26. The UE1 of claim 25, wherein the subframe comprises a plurality of Physical Resource Block (PRB) pairs, wherein the UE1 is further configured to receive a bitmap, and wherein a location of the first EPDCCH and a location of the second EPDCCH is indicated by the bitmap.

27. The UE1 of claim 26, wherein the bitmap indicates whether a PRB pair is for UE1.

28. The UE1 of claim 26, wherein the bitmap indicates whether a subframe is for UE1.

29. The UE1 of claim 25, wherein the second control information is transmit power control (TPC) information.

30. The UE1 of claim 25, wherein the UE1 is further configured to determine a mapping of the first control information into the first EPDCCH in response to a type of common control information.

* * * * *